US011869732B2

(12) United States Patent
Nakase et al.

(10) Patent No.: US 11,869,732 B2
(45) Date of Patent: Jan. 9, 2024

(54) MULTI-DIRECTIONAL INPUT DEVICE, HANDLE AND GAME MACHINE

(71) Applicant: Shenzhen Zesum Technology Co., Ltd., Shenzhen (CN)

(72) Inventors: Yusho Nakase, Shenzhen (CN); Shiying Yang, Shenzhen (CN); Chaoxian Chen, Shenzhen (CN)

(73) Assignee: Shenzhen Zesum Technology Co., Ltd., Shenzhen (CN)

(*) Notice: Subject to any disclaimer, the term of this patent is extended or adjusted under 35 U.S.C. 154(b) by 243 days.

(21) Appl. No.: 17/535,782

(22) Filed: Nov. 26, 2021

(65) Prior Publication Data
US 2022/0084762 A1 Mar. 17, 2022

Related U.S. Application Data

(63) Continuation of application No. PCT/CN2020/108458, filed on Aug. 11, 2020.

(30) Foreign Application Priority Data

Jun. 29, 2020 (CN) .......................... 202010606992.8

(51) Int. Cl.
| | | |
|---|---|---|
| *H01H 25/04* | (2006.01) | |
| *H01H 25/00* | (2006.01) | |
| *A63F 13/24* | (2014.01) | |

(52) U.S. Cl.
CPC ........... *H01H 25/008* (2013.01); *A63F 13/24* (2014.09); *H01H 25/04* (2013.01);
(Continued)

(58) Field of Classification Search
CPC .... H01H 23/143; H01H 23/30; H01H 23/025; H01H 2300/03; H01H 23/145;
(Continued)

(56) References Cited

U.S. PATENT DOCUMENTS

| | | | | |
|---|---|---|---|---|
| 2003/0144752 A1* | 7/2003 | Furukawa | .............. | G05G 9/047 700/85 |
| 2006/0060455 A1* | 3/2006 | Mimata | .............. | G05G 9/04796 200/48 A |

(Continued)

FOREIGN PATENT DOCUMENTS

| | | |
|---|---|---|
| CN | 101009170 A | 8/2007 |
| CN | 201886944 U | 6/2011 |

(Continued)

OTHER PUBLICATIONS

Decision to Grant a Patent issued in counterpart Japanese Patent Application No. 2020-557295, dated Oct. 25, 2022.

(Continued)

*Primary Examiner* — Ahmed M Saeed
(74) *Attorney, Agent, or Firm* — Westbridge IP LLC

(57) ABSTRACT

Disclosed is a multi-directional input device. The device includes: an upper case, defining an opening part in a center of a top part; a first operating member, protruding from the opening part and including a flange; a first sliding member, defining a first opening; an elastic piece, arranged on an outer periphery of the first sliding member and configured to push the first sliding member back to an origin position; a second and third sliding members sliding in X and Y directions, respectively; a first and second movable contacts provided on the second the third sliding members, respectively; a circuit board, including a first and second fixed contacts; a push member including a flat part in contact with
(Continued)

the flange and a boss; a coil spring, pushing the push member upward; a first support, configured to hold the push member at an upper limit position; and a lower case.

9 Claims, 9 Drawing Sheets

(52) U.S. Cl.
CPC . *H01H 2221/012* (2013.01); *H01H 2221/044* (2013.01); *H01H 2231/008* (2013.01)

(58) Field of Classification Search
CPC .. H01H 2221/016; H01H 23/14; H01H 23/04; H01H 23/168; H01H 2221/018; H01H 23/02; H01H 23/12; H01H 23/003; H01H 23/146; H01H 23/16; H01H 23/20; H01H 23/28; H01H 23/00; H01H 23/148; H01H 23/24; H01H 23/26; H01H 19/14; H01H 19/11; H01H 19/585; H01H 19/58; H01H 19/62; H01H 19/635; H01H 19/64; H01H 19/63; H01H 19/005; H01H 19/10; H01H 1/2041; H01H 19/56; H01H 19/03; H01H 19/02; H01H 2019/006; H01H 19/00; H01H 19/20; H01H 19/001; H01H 21/50; H01H 2221/01; H01H 3/125; H01H 13/705; H01H 13/14; H01H 13/04; H01H 13/10; H01H 13/70; H01H 13/704; H01H 13/7065; H01H 13/7006; H01H 13/7057; H01H 13/78; H01H 13/79; H01H 13/52; H01H 13/703; H01H 13/507; H01H 3/12; H01H 13/20
See application file for complete search history.

(56) References Cited

U.S. PATENT DOCUMENTS

| 2009/0050465 A1* | 2/2009 | Asada | H01H 25/06 200/6 A |
| 2015/0198964 A1* | 7/2015 | Asano | G05G 5/05 74/471 XY |
| 2019/0115173 A1* | 4/2019 | Noh | G05G 9/04792 |

FOREIGN PATENT DOCUMENTS

| CN | 102568904 A | 7/2012 |
| CN | 105374609 A | 3/2016 |
| CN | 111603762 A | 9/2020 |
| CN | 111668057 A | 9/2020 |
| CN | 111669890 A | 9/2020 |
| CN | 212277074 U | 1/2021 |
| CN | 212277075 U | 1/2021 |
| CN | 212278540 U | 1/2021 |
| EP | 1708219 A1 | 10/2006 |
| JP | 2007200707 A | 8/2007 |
| JP | 2007227337 A | 9/2007 |
| JP | 2008171679 A | 7/2008 |
| JP | 2010073642 A | 4/2010 |
| JP | 2011210525 A | 10/2011 |

OTHER PUBLICATIONS

International Search Report and Written Opinion issued in corresponding PCT Application No. PCT/CN2020/108458, dated Mar. 29, 2021.

* cited by examiner

MULTI-DIRECTIONAL INPUT DEVICE, HANDLE AND GAME MACHINE

CROSS-REFERENCE TO RELATED APPLICATIONS

This application is a continuation application of PCT Application No. PCT/CN2020/108458, filed on Aug. 11, 2020, which claims priority to Chinese Patent Application No. 202010606992.8, filed on Jun. 29, 2020, and entitled "MULTI-DIRECTIONAL INPUT DEVICE, HANDLE AND GAME MACHINE", the entire disclosure of which are incorporated herein by reference.

TECHNICAL FIELD

The present disclosure relates to the technical field of game machines, and in particular to a multi-directional input device, a handle applying the multi-directional input device, and a game machine applying the handle.

BACKGROUND

Although the existing multi-directional input device of the handle of the game machine can be rotated within a 360-degree range, it cannot be pressed at any position within the 360-degree movement range. This leads to a poor user experience.

SUMMARY

In view of the above-mentioned problems, the present disclosure provides a multi-directional input device, which aims to enable the multi-directional input device not only to slide in a horizontal 360-degree omnidirectional direction, but also to be pressed within the horizontal 360-degree omnidirectional range to trigger switch signals.

To solve the above technical problems, the present disclosure provides a multi-directional input device, including:
an upper case, defining an opening part in a center of a top part;
a first operating member, protruding from the opening part;
a first sliding member, having a disc-shaped structure, and configured to slide in a horizontal 360-degree omnidirectional range under driving of the first operating member;
an elastic piece, arranged on an outer periphery of the first sliding member and configured to push the first sliding member back to an origin position;
a second sliding member, configured to slide under driving of the first sliding member in a X direction;
a third sliding member, configured to slide under driving of the first sliding member in a Y direction;
a first movable contact, provided on the second sliding member;
a second movable contact, provided on the third sliding member;
a circuit board, including:
a first fixed contact, in electrical contact with the first movable contact; and
a second fixed contact, in electrical contact with the second movable contact; and
a lower case, fitted and connected with the upper case, and accommodating the first operating member, the first sliding member, the elastic piece, the second sliding member, the third sliding member, the first movable contact, the second movable contact, and the circuit board; and,
wherein:
the first sliding member defines a first opening at a horizontal center to keep the first operating member movable vertically;
the first operating member includes a disc-shaped flange extending horizontally at an end at a lower side of the first sliding member;
the multi-directional input device further includes:
a push member, including:
a flat part in contact with the disc-shaped flange and having a larger diameter than a diameter of the disc-shaped flange; and
a boss, provided at a lower part of a horizontal center of the push member and configured to operate a switch function of a dome switch;
a coil spring, configured to push the push member upward; and
a first support, configured to hold the push member pushed up by the coil spring at an upper limit position, wherein the first sliding member is configured to slide in the horizontal 360-degree omnidirectional range under driving of the first operating member, and the first operating member is pressed within the horizontal 360-degree omnidirectional range to trigger the dome switch.

Further, the second sliding member is disposed orthogonally to the third sliding member, the second sliding member defines a second opening, the third sliding member defines a third opening, and the first sliding member is configured to pass through the second opening and the third opening to drive the second sliding member to slide in the X direction and the third sliding member to slide in the Y direction.

Further, at least one of the second sliding member and the third sliding member is combined with a metal frame defining an opening by injection molding.

Further, the flat part of the push member is circular or polygonal, an area of the flat part is greater than an area of the disc-shaped flange of the first operating member, and greater than or equal to a sliding amount of the first operating member.

Further, the flat part of the push member is circular or polygonal, an area of the flat part is less than or equal to an area of the disc-shaped flange of the first operating member, and less than or equal to a sliding amount of the first operating member.

Further, the circuit board is covered with the dome switch at a position opposite to the boss of the push member.

Further, the push member further includes a protrusion part surrounding the boss and concentrically disposed with the boss.

The present disclosure further provides a handle including the foregoing multi-directional input device.

The present disclosure further provides a game machine including the foregoing handle.

In the technical solution of the present disclosure, when the first operating member is pushed, the first operating member can drive the orthogonally arranged second sliding member and third sliding member to stably slide in the X direction and the Y direction. At the same time, the first movable contact and the second movable contact which are connected to the second sliding member and the third sliding member respectively can also stably slide in the X direction and the Y direction together. Since the first movable contact and the second movable contact are connected to the first fixed contact of the circuit board and the second fixed contact of the circuit board, respectively, an output signal corresponding to the sliding positions of the second sliding member and the third sliding member can be output, thereby achieving precise control of displacement accuracy. The first sliding member can slide in the horizontal 360-degree omnidirectional range under driving of the first operating member, and the first operating member can be pressed within the horizontal 360-degree omnidirectional range to trigger the dome switch. Further, since the elastic piece is provided on the outer periphery of the first sliding member, it can provide a force for returning the first operating member back to the origin position.

BRIEF DESCRIPTION OF THE DRAWINGS

In order to more clearly explain the embodiments of the present disclosure or the technical solutions in the prior art, the following will briefly introduce the drawings required in the embodiments or the description of the prior art. Obviously, the drawings in the following description are only some embodiments of the present disclosure. For those of ordinary skill in the art, without paying any creative work, other drawings can be obtained according to the structures shown in these drawings.

Figure 1:
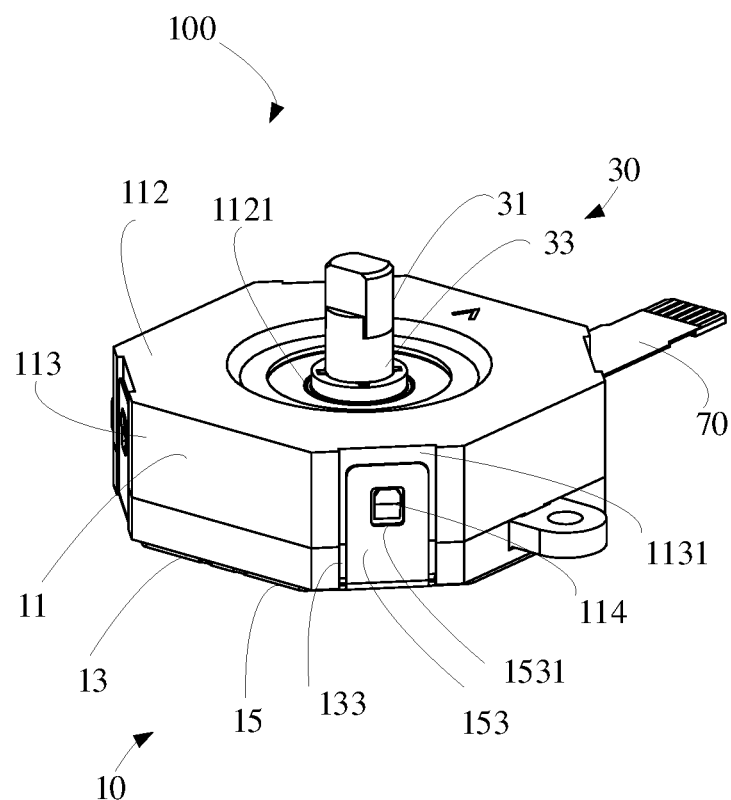
FIG. 1 is a schematic structural diagram of a multi-directional input device according to an embodiment of the present disclosure.

The implementation, functional characteristics and advantages of the present disclosure will be further described in conjunction with the embodiments and with reference to the drawings.

DETAILED DESCRIPTION OF THE EMBODIMENTS

The technical solutions in the embodiments of the present disclosure will be described clearly and completely in conjunction with the drawings in the embodiments of the present disclosure. Obviously, the described embodiments are only a part of the embodiments of the present disclosure, and not all the embodiments. Based on the embodiments of the present disclosure, all other embodiments obtained by a person of ordinary skill in the art without making creative efforts fall within the protection scope of the present disclosure.

It should be noted that all the directional indicators (such as up, down, left, right, front, back . . . ) in the embodiments of the present disclosure are only used to explain the relative positional relationship, movement conditions, etc. of the components in a specific posture (as shown in the drawings), if the specific posture changes, the directional indicator also changes accordingly.

In addition, descriptions related to "first", "second", etc. in the present disclosure are for descriptive purposes only, and cannot be understood as indicating or implying their relative importance or implicitly indicating the number of indicated technical features. Thus, the features defined as "first" and "second" can include at least one of the features either explicitly or implicitly. In addition, the technical solutions between the various embodiments can be combined with each other, but they must be based on the ability of those skilled in the art to realize. When the combination of technical solutions conflicts with each other or cannot be realized, it should be considered that the combination of such technical solutions does not exist, nor within the scope of protection required by the present disclosure.

Figure 2:
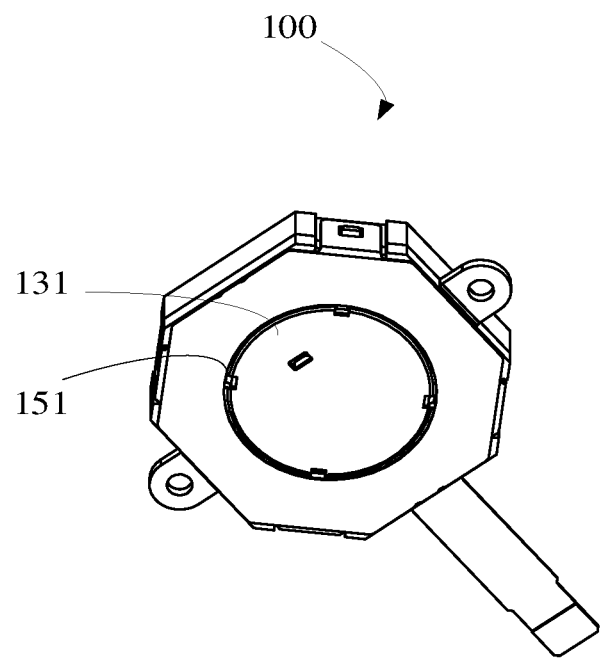
FIG. 2 is a schematic structural diagram of the multi-directional input device of FIG. 1 from another perspective.
Figure 3:
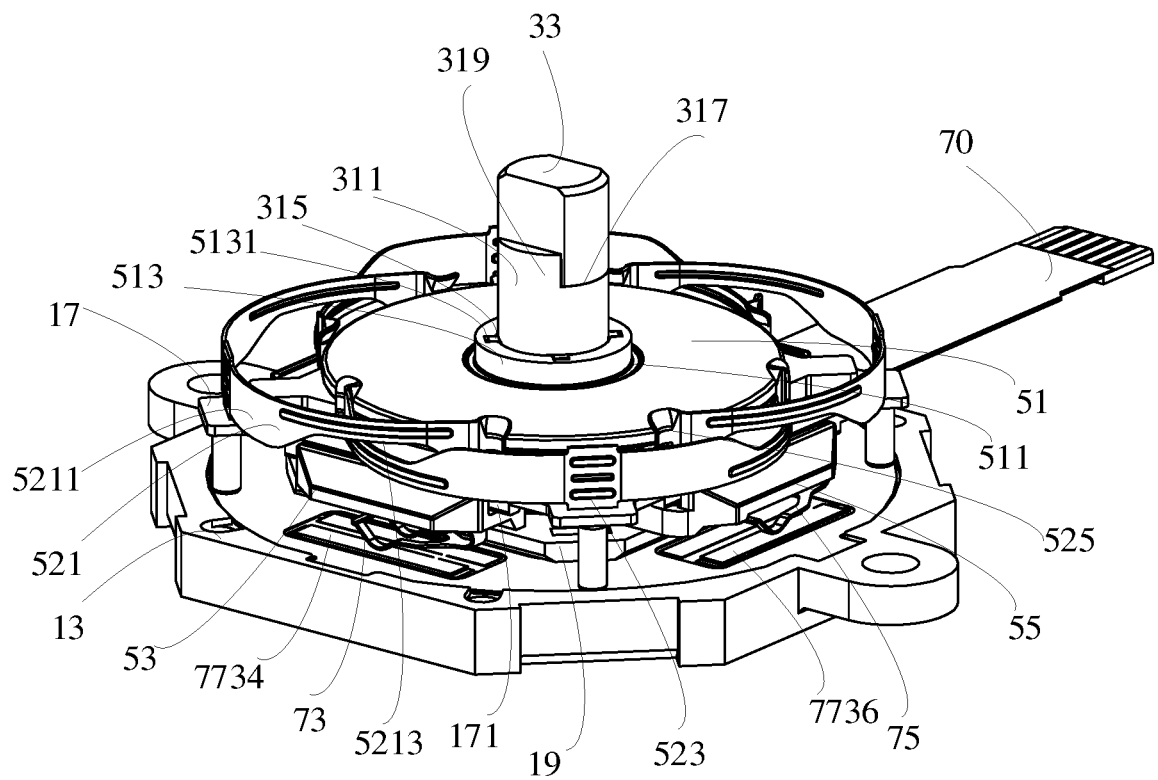
FIG. 3 is a partial structural diagram of the multi-directional input device of FIG. 1.
Figure 4:
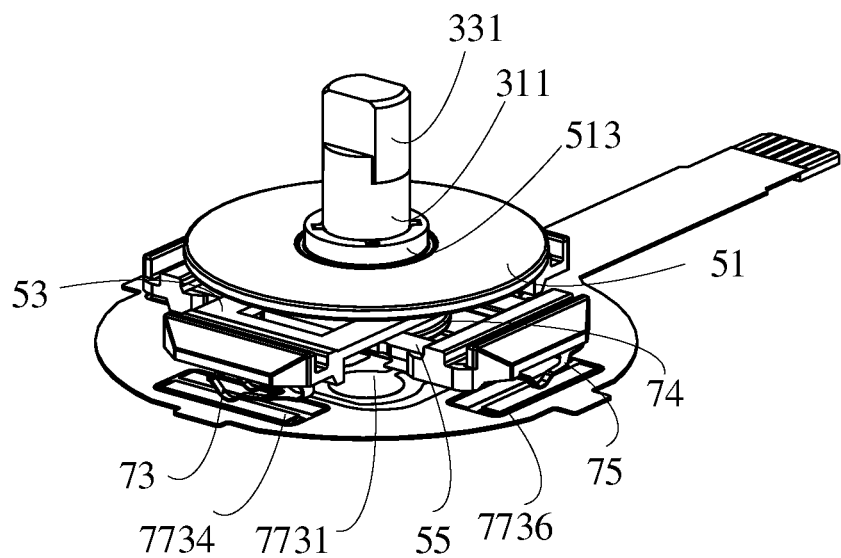
FIG. 4 is another partial structural diagram of the multi-directional input device of FIG. 1.
Figure 5:
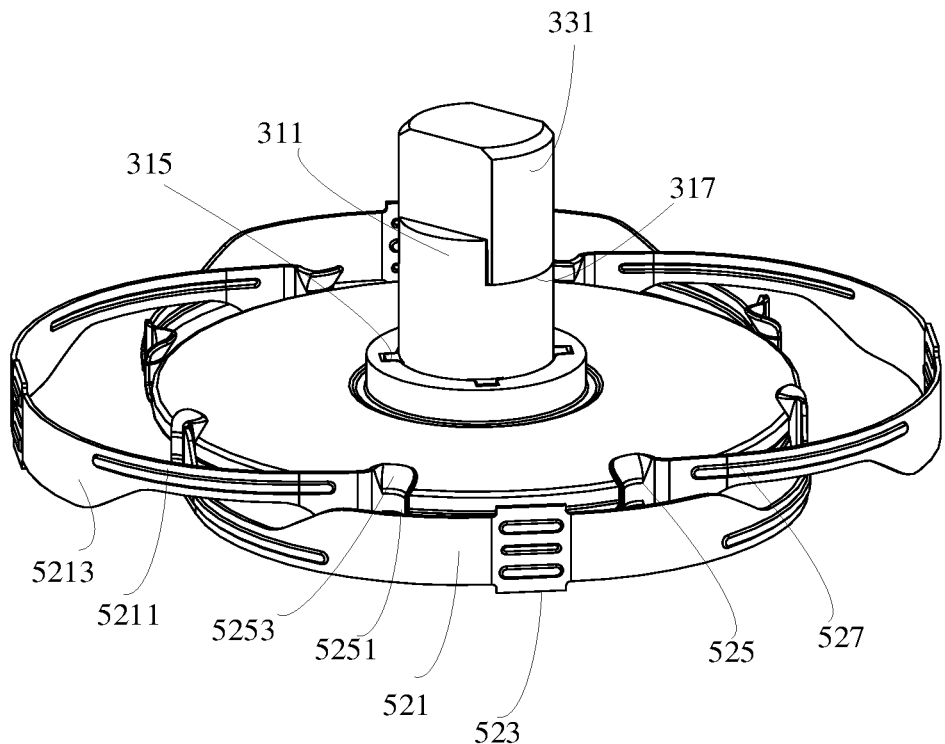
FIG. 5 is a schematic structural diagram of a joystick assembly of FIG. 1.
Figure 6:
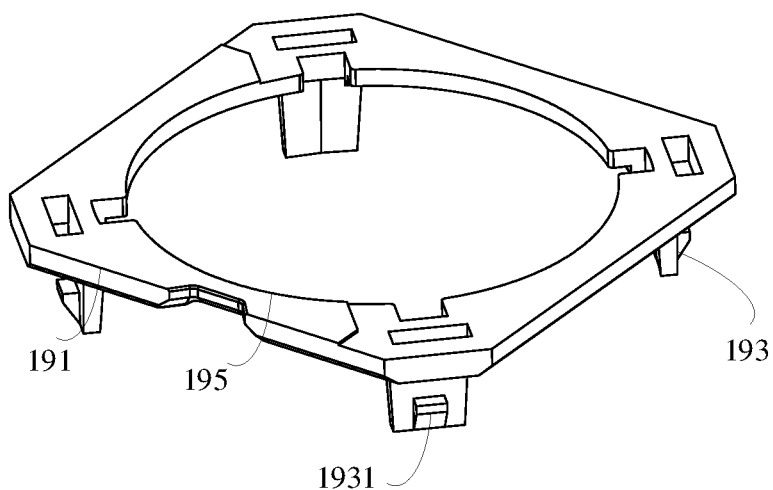
FIG. 6 is a schematic structural diagram of a second support of FIG. 1.
Figure 7:
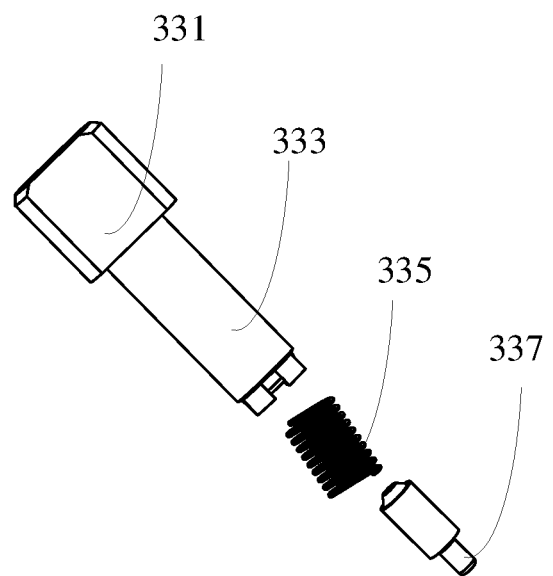
FIG. 7 is a schematic structural diagram of a second operating member of FIG. 1.
Figure 8:
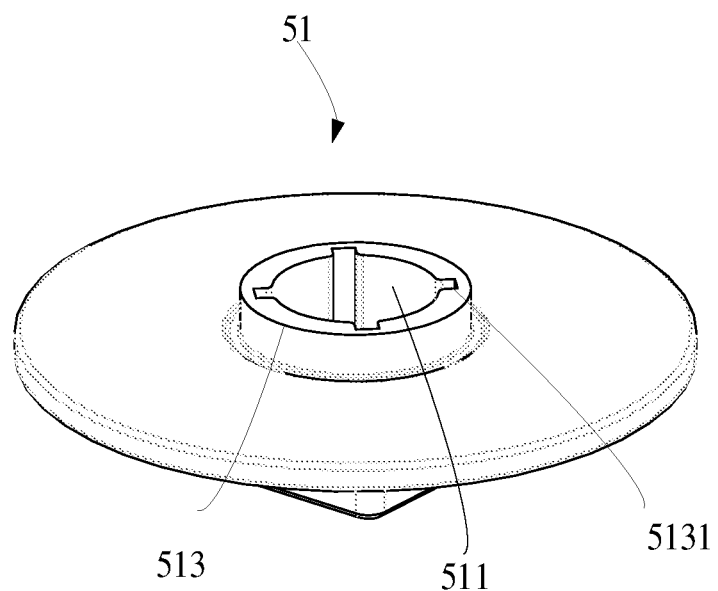
FIG. 8 is a schematic structural diagram of a first sliding member of FIG. 1.
Figure 9:
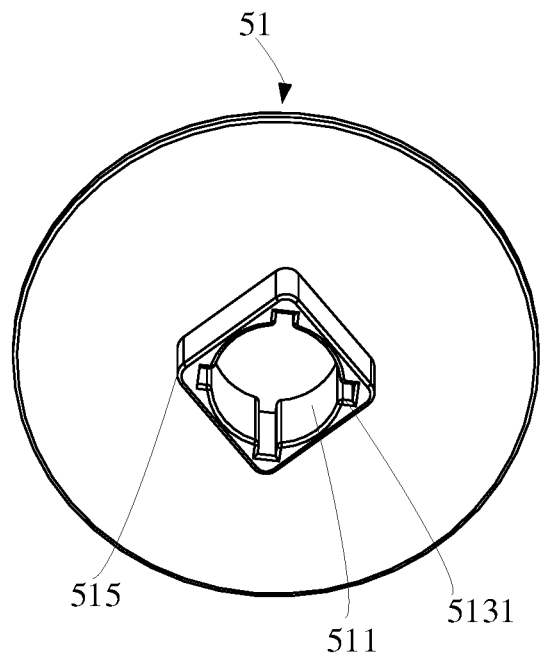
FIG. 9 is a schematic structural diagram of the first sliding member of FIG. 8 from another perspective.
Figure 10:
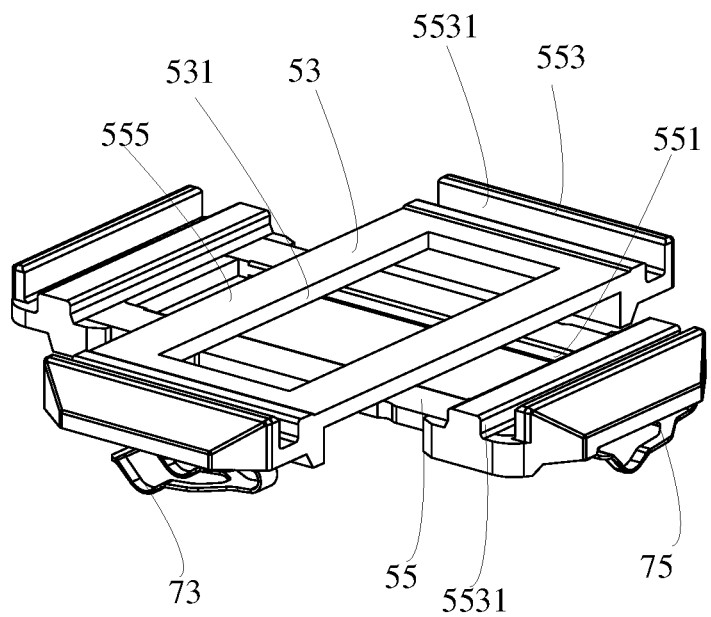
FIG. 10 is still another partial structural diagram of the multi-directional input device of FIG. 1.
Figure 11:
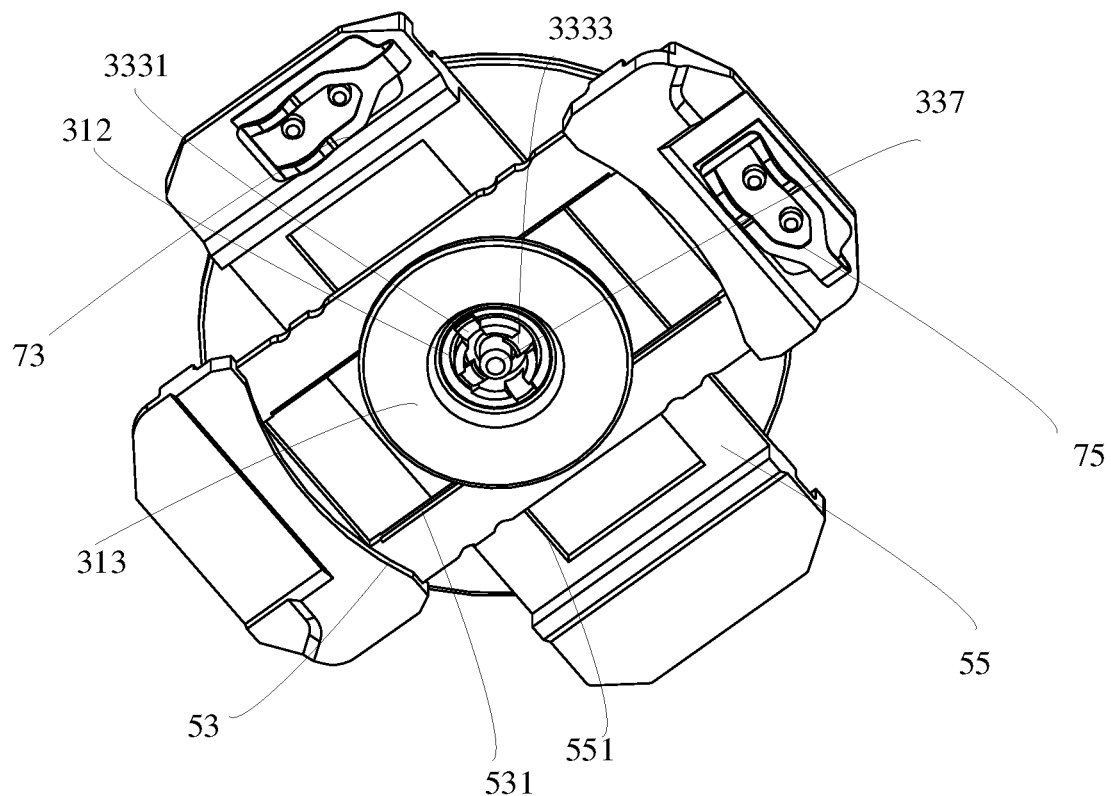
FIG. 11 is a further partial structural diagram of the multi-directional input device of FIG. 1.
Figure 12:
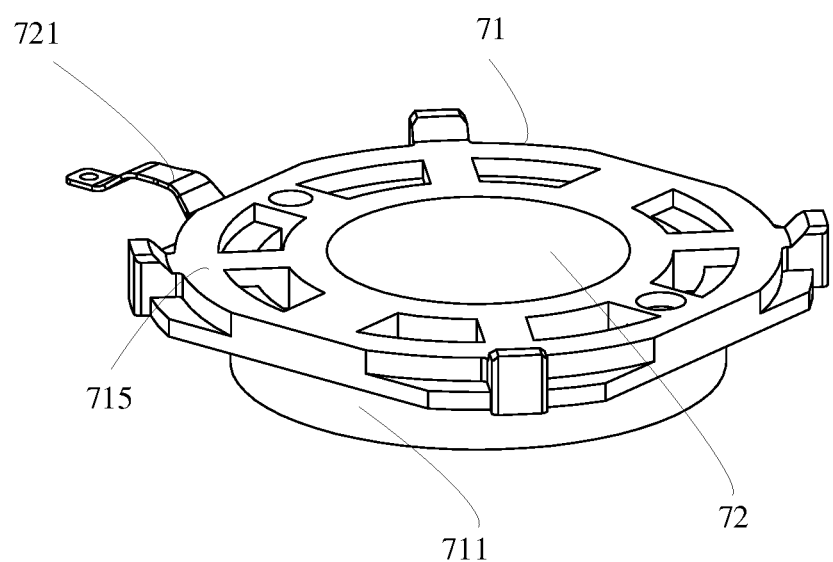
FIG. 12 is a schematic structural diagram of a push member and a contact plate of FIG. 1.
Figure 13:
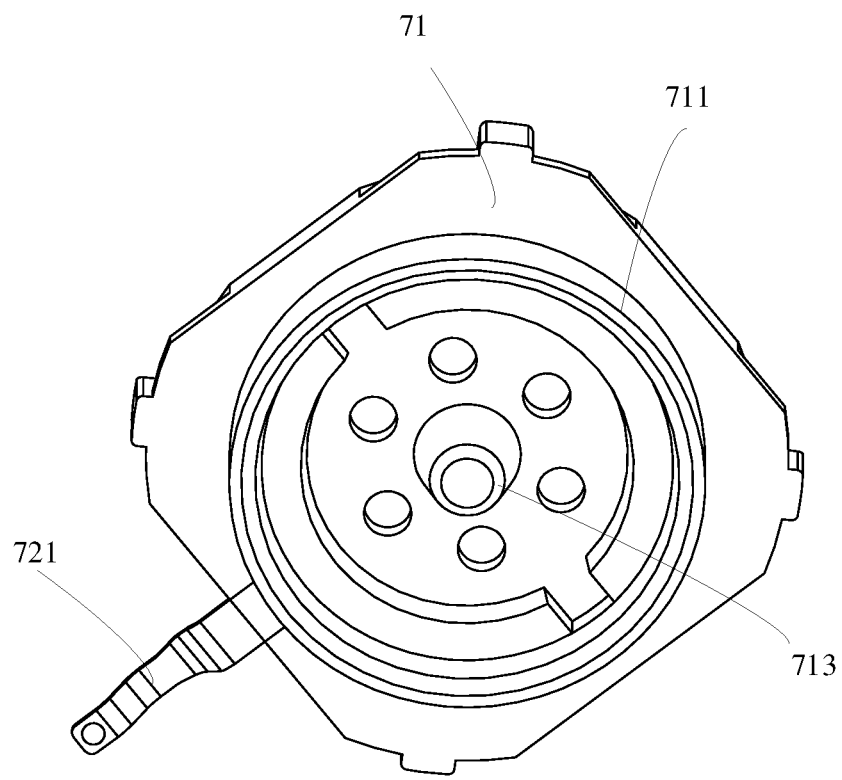
FIG. 13 is a schematic structural diagram of the push member and the contact plate of FIG. 12 from another perspective.
Figure 14:
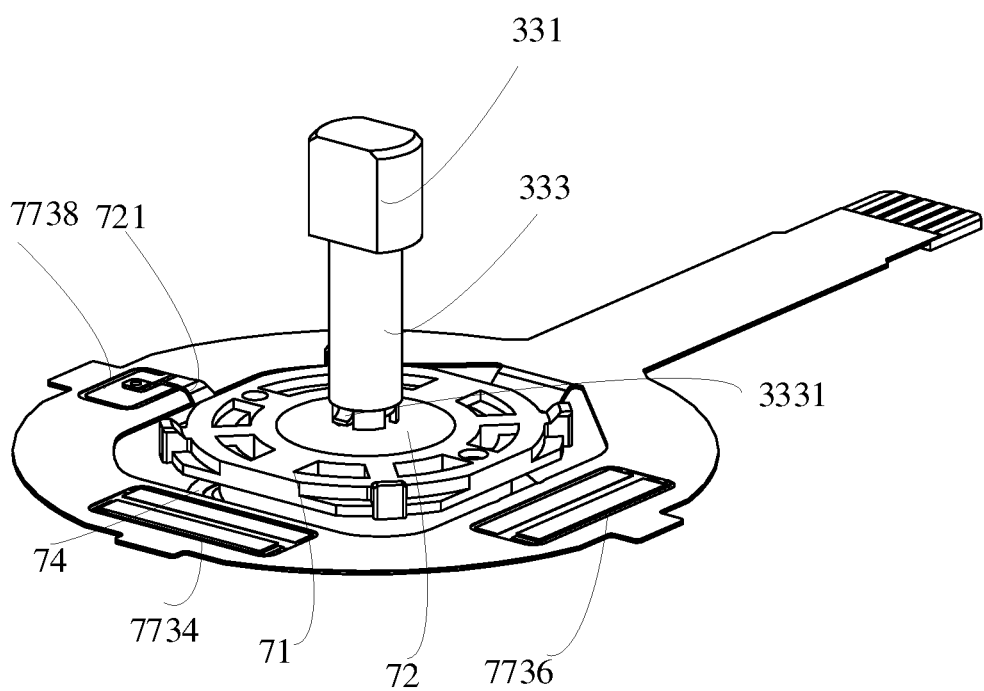
FIG. 14 is a further partial structural diagram of the multi-directional input device of FIG. 1.
Figure 15:
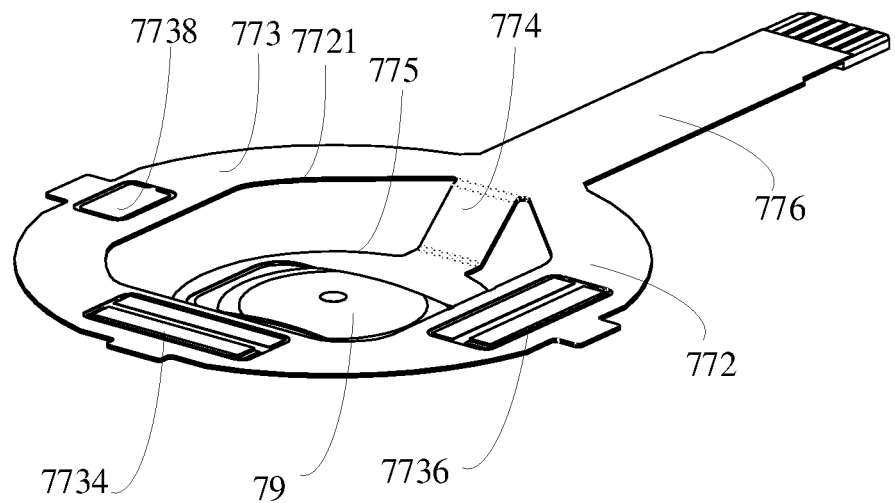
FIG. 15 is a schematic structural diagram of a circuit board of FIG. 1.
Figure 16:
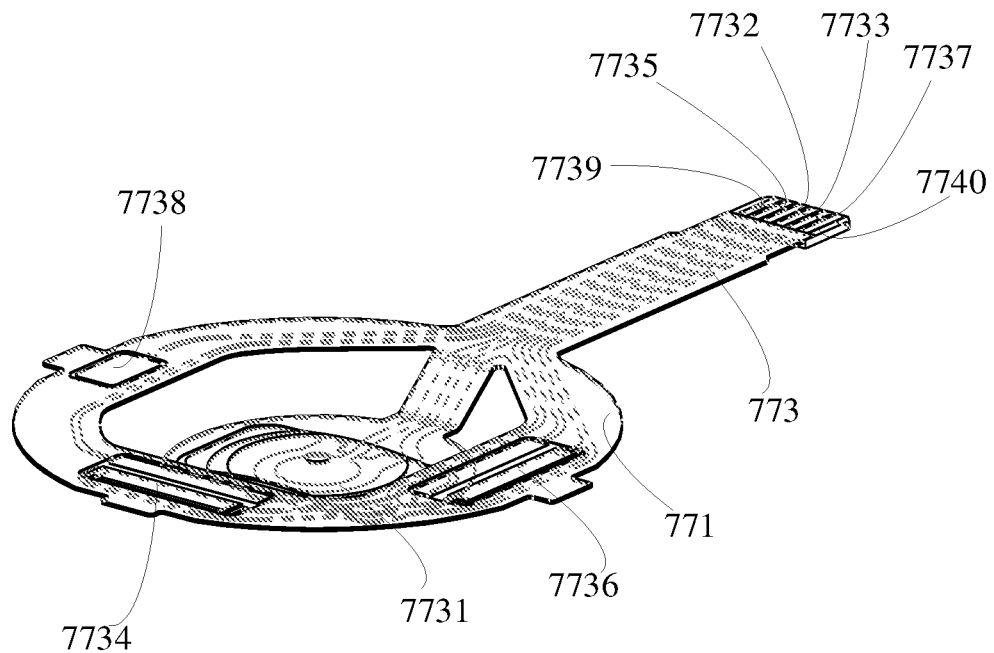
FIG. 16 is a circuit diagram of the circuit board of FIG. 15.
Figure 17:
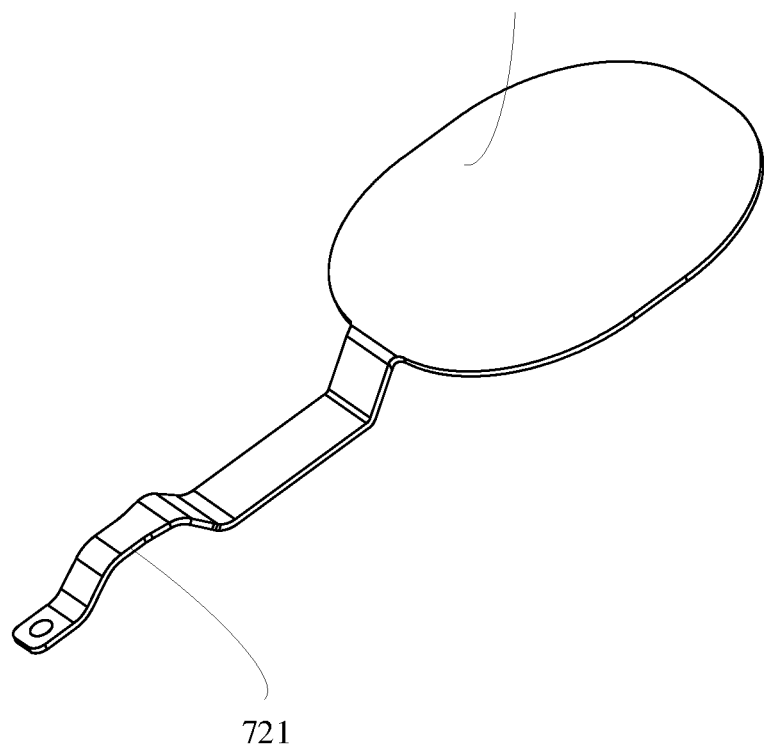
FIG. 17 is a schematic structural diagram of the contact plate of FIG. 12.

Referring to FIGS. 1 to 17, in some embodiments of the present disclosure, the multi-directional input device 100 provided by the present disclosure is applied to a game machine.

It can be understood that the multi-directional input device 100, that is, a device for controlling directional input, can be a multi-directional input device of a handle of a game machine, or can be a direction key input structure of a handle of a game machine.

The multi-directional input device 100 includes a case assembly 10, a joystick assembly 30, a sliding assembly 50, and a direction sensing assembly 70.

The case assembly 10 includes an upper case 11, a lower case 13, a fastener 15 connecting the upper case 11 and the lower case 13, a first support 17 and a second support 19. The upper case 11 is disposed above the lower case 13 and defines an accommodating space together with the lower case 13. The joystick assembly 30, the sliding assembly 50, the direction sensing assembly 70, the second support 19 and the first support 17 are accommodated in the accommodating space 111.

The upper case 11 includes a top wall 112 and a side wall 113, an opening part 1121 is defined in a center of the top wall 112, and at least one engaging member 114 is protruded from the side wall 113. A plurality of connecting posts 115 are further provided on an inner surface of the top wall 112.

In an embodiment, an avoiding area 1131 is defined on the side wall 113, and the engaging member 114 is formed on the avoiding area 1131.

In some embodiments, the plurality of connecting posts 115 are provided on the inner surface of the top wall 112. The lower case 13 defines connecting holes, and the connecting posts 115 are connected to the connecting holes to connect the upper case 11 and the lower case 13.

A groove is recessed on a plate body of the lower case 13. A protrusion 131 is formed on a surface of the plate body away from the groove corresponding to the groove. It can be understood that the groove is defined by depression on a surface of the plate body, and the protrusion 131 is formed correspondingly. An avoiding area 133 is also defined on the side wall of the lower case 13.

The fastener 15 includes an opening 151, and the protrusion 131 is accommodated in the opening 151. The fastener 15 further includes at least one fixing plate 153, and the fixing plate 153 defines an engaging hole 1531. The fixing plate 153 is disposed close to the avoiding area 133 and the avoiding area 1131, and the engaging member 114 of the upper case is engaged in the engaging hole 1531 to connect the upper case 11 and the lower case 13.

The joystick assembly 30 includes a first operating member 31 and a second operating member 33 connected to the first operating member 31.

The first operating member 31 includes a cylinder 311 and a disc-shaped flange 313 protruding from one end of the cylinder 311 and extending in the horizontal direction. The cylinder 311 and the flange 313 both have a hollow structure, so that the second operating member 33 can be configured to pass through the hollow structures. At least one ridge 315 is protruded from an outer wall of the cylinder 311. At least one notch 317 is defined at an end of the cylinder 311 away from the flange 313, so as to form clamping arms 319. Inner surfaces of the clamping arms 319 are flat. The second operating member 33 can be configured to pass through the cylinder 311 and be engaged in the notch 317. The first operating member 31 is configured to protrude from the opening part 1121, and the first sliding member 51 can slide in the horizontal 360-degree omnidirectional range under driving of the first operating member 31.

The clamping arms 319 can be made of plastic material.

The first sliding member 51 and the first operating member 31 can be an integrated structure or separate structures.

The first operating member 31 defines a through hole in the up-down direction.

The second operating member 33 is made of a conductive material and configured to be exposed above the first operating member 31. The second operating member 33 includes a main body 331, and a tube part 333 which is inserted into the through hole of the first operating member 31 is located under the main body 331. A sensing unit parallel to the first sliding member 31 is accommodated in the tube part 333. The sensing unit includes an induction contact 337 made of a conductive material and a metal spring 335 for pressing the induction contact 337, the induction contact 337 is located under the metal spring 335. The induction contact 337 of the second operating member 33 is configured to protrude from a lower surface of the disc-shaped flange of the first operating member 31 under the elastic force of the metal spring 335. A contact plate 72 is arranged parallel to the first sliding member 51. An elastic contact arm 721 is extended at any position on an outer periphery of the contact plate 72. The contact arm 721 is in contact with a circuit board 77. The induction contact 337 is electrically connected to the contact arm 721.

The main body 331 includes two oppositely disposed planes. When the second operating member 33 is accommodated in the hollow structure, the main body 331 is configured to rest on a bottom wall of the notch 317. The two planes of the main body 331 are fitted with the two planes of the clamping arms 319. One end of the tube part 333 has an opening, and the induction contact 337 can extend out of the tube part 333 through the opening. The metal spring 335 can provide resilience force to the induction contact 337, so that the induction contact 337 can return to the origin position. In an embodiment, the metal spring 335 can resist against the induction contact 337, so that a part of the induction contact 337 can extend out of the tube part 333, that is, the induction contact 337 of the second operating member 33 can extend out the tube part 333 under the elastic force of the metal spring 335.

An end of the tube part 333 away from the upper case 11 is provided with at least one first riveted part 3331 extending toward the outside of the tube part 333 and at least one second riveted part 3333 extending toward the inside of the tube part 333. An end of the first operating member 31 away from the upper case is formed with an annular riveted boss 312. The first riveted part 3331 is riveted on the riveted boss 312 to rivet and connect the second operating member 33 and the first operating member 31.

In an embodiment, at least two outwardly disposed first riveted parts 3331 are provided, and the at least two first riveted parts 3331 are oppositely arranged.

In an embodiment, at least two inwardly disposed second riveted parts 3333 are provided, and the at least two second riveted parts are oppositely arranged to prevent the induction contact of the second operating member 33 from falling off.

In an embodiment, after the metal spring 335 is installed in the tube part 333, the induction contact 337 is also installed in the tube part 333. An end of the metal spring 335 away from the main body 331 is configured to resist against an end of the induction contact 337, and an end of the induction contact 337 away from the metal spring 335 is configured to extend out of the tube part 333. Under the elasticity of the metal spring 335, a length of the part of the induction contact 337 extending out of the tube part 333 can remain unchanged. Even when the main body 331 is pressed and the induction contact 337 moves downward to come into contact with the contact plate 72, the length of the part of the induction contact 337 extending out of the tube part 333 can remain unchanged under the action of the metal spring 335.

It can be understood that the joystick assembly 30 may not be provided with the second operating member 33 and only be provided with the first operating member 31.

In an embodiment, the material of the second operating member 33 is metal or conductive plastic.

The sliding assembly 50 includes a disc-shaped first sliding member 51, an elastic piece 52, a second sliding member 53, and a third sliding member 55 disposed orthogonally to the second sliding member 53.

In an embodiment, the first sliding member 51 defines a first opening 511, the second sliding member 53 defines a second opening 531, and the third sliding member 55 defines a third opening 551. The first sliding member 51, the first operating member 31, and the second operating member 33 are configured to pass through the first opening 511, the second opening 531, and the third opening 551.

In another embodiment, the first sliding member 51 defines a first opening 511, the second sliding member 53 defines a second opening 531, and the third sliding member 55 defines a third opening 551. The first operating member 31 is fixedly connected in the first opening 511 (that is, the first sliding member 51 is provided integrally with the first operating member 31). The first operating member 31 and the second operating member 33 are configured to movably pass through the second opening 531 and the third opening 551.

A plurality of the elastic pieces 52 are arranged on an outer periphery of the first sliding member 51 and almost on the same horizontal plane as the first sliding member 51.

The plurality of elastic pieces 52 are arranged crosswise on the outer periphery of the first sliding member 51 to push the first sliding member 51 back to the origin position. In an embodiment, the plurality of elastic pieces 52 are configured to cover the outer periphery of the first sliding member 51.

When the first operating member 31 and the second operating member 33 move, the plurality of elastic pieces 52 can elastically deform to push the first operating member 31 and the second operating member 33 to return to the origin position.

The plurality of elastic pieces 52 arranged crosswise are configured to cover the outer periphery of the first sliding member 51 to better provide the resilient force to the first operating member 31.

Each elastic piece 52 has a C-shaped structure with a central fixing part 523 located in a middle region, elastic parts 521 located at both ends of the central fixing part 523, and driving parts 525 located at the front ends of the elastic parts 521. The driving parts 525 are configured to apply force on the first sliding member 51 toward the origin reset direction to abut the first sliding member 51 against the outer periphery of the first sliding member 51.

The elastic part 521 includes a first elastic part 5211 connected to the central fixing part 523, and a second elastic part 5213 connected to the first elastic part 5211 and the driving part 525 at both ends, respectively. One of the adjacent two second elastic parts 5213 is located above the other one of the two adjacent second elastic parts 5213, and the adjacent two second elastic parts 5213 are arranged crosswise.

A width of the second elastic part 5213 is narrower than a width of the first elastic part 5211. The width of the second elastic part 5213 is less than one-half of the width of the first elastic part 5211.

A length of the elastic part 521 is 16~24 mm.

The driving part 525 includes a linear part 5251 configured to push the outer periphery of the first sliding member 51. The linear part 5251 is parallel to the outer periphery of the first sliding member 51. A length of the linear part 5251 is the same as a thickness of the first sliding member 51. A stop part 5253 that is curved toward an inner diameter direction of the first sliding member 51 is formed at both ends of the linear part 5251, respectively. The driving part 525 can be substantially U-shaped or V-shaped.

The stop part 5253 of the driving part 525 is located at the origin of the first sliding member 51, so as to be arranged to face the vertical surface of the upper case 11 formed in an inner circumferential direction of the first sliding member 51 while maintaining a gap.

In an embodiment, a reinforcing rib 527 is formed on an inner surface and/or outer surface of the elastic piece 52 to increase the strength of the elastic piece 52. The reinforcing rib 527 is configured to extend along a longitudinal direction of the elastic piece 52.

The shapes of the plurality of elastic pieces 52 can be the same or different, and can be set according to actual needs.

In an embodiment, the plurality of elastic pieces 52 and the first sliding member 51 are located on a same horizontal plane.

Specifically, a central surface of the first sliding member 51 perpendicular to a thickness direction of the first sliding member 51 and a central surface of each elastic piece 52 perpendicular to a width direction of the elastic piece 52 are on a same horizontal plane, so that the first sliding member 51 can slide stably and smoothly within 360 degrees under the action of the elastic pieces 52.

In another embodiment, a central surface of the first sliding member 51 perpendicular to a thickness direction of the first sliding member 51 and a central surface of the elastic part 521 of each elastic piece 52 perpendicular to a width direction of the elastic part 521 of the elastic piece 52 are on a same horizontal plane.

In still another embodiment, a central surface of the first sliding member 51 perpendicular to a thickness direction of the first sliding member 51 and a central surface of the driving part 525 of each elastic piece 52 perpendicular to a width direction of the driving part 525 of the elastic piece 52 are on a same horizontal plane.

It can be understood that the cost of the elastic piece 52 is relatively low, and installation of the elastic piece 52 on the first sliding member 51 is also easily achieved by automated assembly.

A flange 513 is protruded from an upper surface of the first sliding member 51 along a periphery of the first opening 511, and at least one sliding groove 5131 is further defined on an inner surface of the flange 513. The cylinder 311 of the first operating member 31 can movably pass through the first opening 511 or be fixedly accommodated in the first opening 511, and the ridge 315 of the cylinder 311 can be accommodated in the sliding groove 5131. A square frame 515 is further protruded from an end of the first sliding member 51 away from the flange 513. The square frame 515 is accommodated in an overlapping area of the second opening 531 and the third opening 551, so that during the rotation of the first sliding member 51, the second sliding member 53 and the third sliding member 55 can be driven by the square frame 515 to move in a X direction and a Y direction, respectively. The X direction is perpendicular to the Y direction. The switch signal input end 7731 is electrically connected to the dome switch 777 (i.e., key switch). There is a gap between the switch signal input end 7731 together with the dome switch 777 and the boss 713.

The first sliding member 51 is configured to slide in the horizontal 360-degree omnidirectional range under driving of the first operating member 31, and the first operating member 31 is pressed within the horizontal 360-degree omnidirectional range to trigger the switch signal of the dome switch 777.

At least one of the second sliding member 53 and the third sliding member 55 is manufactured by means of injection molding.

The second sliding member 53 and the third sliding member 55 each include a frame 555 and rails 553 provided at both opposite ends of the frame 555.

The material of at least one frame 555 is metal, preferably stainless steel, so as to increase the mechanical strength of the second sliding member 53 and the third sliding member 55. The material of at least one rail 553 is plastic, and the plastic and metal can be connected together by injection molding.

The first sliding member 51 is slidably disposed between the upper case 11 and the first support 17, and an end of the first support 17 is disposed on the rail 553.

In an embodiment, the first sliding member 51 is slidably disposed on the first support 17. The first support 17 is formed with a plurality of legs, and is provided on the lower case 13 through the plurality of legs to prevent sinking. Each rail 553 defines a sliding groove 5531. The first support 17 is substantially a square structure. The first support 17 includes at least four bumps 171. Each bump 171 is accommodated in the sliding groove 5531 so that the second sliding member 53 and the third sliding member 55 are slidably connected to the first support 17.

After passing through the second opening 531 and the third opening 551, the flange 313 of the first operating member 31 is configured to abut against outer walls of the frames 555 of the second sliding member 53 and the third sliding member 55, so that the first operating member 31 will not disengage from the first sliding member 53 and the third sliding member 55 during the sliding process.

The second support 19 includes a plate body 191, a plurality of pillars 193 protruding on the plate body 191, and a fourth opening 195 defined on the plate body 191. The pillars 193 are rest on the lower case 13 or the circuit board 77. The first operating member 31 and the second operating member 33 are configured to movably pass through the second opening 531, the third opening 551, and the fourth opening 195.

The direction sensing assembly 70 includes a push member 71, a contact plate 72 disposed in the push member 71, a coil spring 74 sleeved on one end of the push member 71, a first movable contact 73 provided on the second sliding member 53, a second movable contact 75 provided on the third sliding member 55, a circuit board 77 provided below the push member 71, and a dome switch 79 provided on the circuit board 77. Both the first movable contact 73 and the second movable contact 75 are electrically connected to the circuit board 77, and the first operating member 31 is disposed on the push member 71.

The push member 71 is substantially an annular structure, a groove is defined in the center of the push member 71, and the contact plate 72 is accommodated in the groove.

The push member 71 includes a flat part 715, and an annular boss 713 and a protrusion part 711 are formed at a lower part of a horizontal center of the push member 71. The boss 713 is configured to operate the dome switch 79, and the coil spring 74 is sleeved on the protrusion part 711 to push the push member 71 upward. The protrusion part 711 is configured to surround the boss 713, and the two are arranged concentrically. The flat part 715 is in contact with the disc-shaped flange 313 and has a larger diameter than the disc-shaped flange 313.

The flat part 715 of the push member 71 is circular or polygonal, an area of the flat part 715 is greater than an area of the disc-shaped flange 313 of the first operating member 31, and greater than or equal to a sliding amount of the first operating member 31.

In another embodiment, the flat part 715 of the push member 71 is circular or polygonal, an area of the flat part 715 is less than or equal to an area of the disc-shaped flange 313 of the first operating member 31, and less than or equal to a sliding amount of the first operating member 31. This embodiment is applicable to the case where there is no second operating member 33.

In an embodiment, a plane of a top surface of the contact plate 72 is lower than a plane of a top surface of the push member 71, or the two planes are flush. A distance between the two planes is 0 mm-2 mm.

In an embodiment, an area of the contact plate 72 is more than twice the sum of a diameter of an extended area of the induction contact 337 and an amount of movement of the second operating member 33. The amount of movement of the second operating member 33 on either side is 1-3 mm, preferably 2 mm.

An elastic contact arm 721 is extended at any position on an outer periphery of the contact plate 72. The contact arm 721 is in contact with a circuit board 77. The contact arm 721 and the induction contact 337 of the second operating member 33 are electrically connected.

After passing through the push member 71, the contact arm 721 can be connected to the contact signal input end 7738.

The part of the induction contact 337 extending out of the tube part 333 can be in contact with the contact plate 72. The induction contact 337 is at least in contact with an edge of the contact plate 72, even if the second operating member 33 is in rotation. When the main body 331 is touched or pressed by a hand, since the main body 331 is made of metal, static electricity can be generated between the main body 331 and the hand. The static electricity is transmitted to the contact plate 72 through the induction contact 337, and then to the contact signal input end 7738 through the contact arm 721. Finally, the contact signal output end 7739 outputs the contact signal.

The circuit board 77 includes a base plate 771 arranged parallel to the first sliding member, and a conductive circuit 773 provided on the base plate 771. The circuit board 77 can be a flexible circuit board. The base plate 771 can be made of polyimide. Polyimide (PI) has excellent high and low temperature resistance, electrical insulation, adhesion, radiation resistance and medium resistance, which can be used for a long time in the temperature range of −269° C.~280° C., and can be used for a short time at a high temperature of 400° C., which is convenient for processing and use.

The base plate 771 includes an annular part 772, a platform part 775 disposed concentrically and parallel to the annular part 772, an inclined part 774 connecting the annular part 772 and the platform part 775, and a straight part 776. The platform part 775 is lower than the annular part 772.

The annular part 772 defines a fifth opening 7721. In an embodiment, the second support 19 is located in the fifth opening 7721.

The conductive circuit 773 includes a switch signal input end 7731, a switch signal output end 7732, a ground end 7733, a first fixed contact 7734, an X direction signal output end 7735, a second fixed contact 7736, a Y direction signal output end 7737, a contact signal input end 7738, a contact signal output end 7739, and a power end 7740. The X direction is perpendicular to the Y direction.

The switch signal output end 7732, the ground end 7733, the X direction signal output end 7735, the Y direction signal output end 7737, the contact signal output end 7739, and the power end 7740 are provided on the straight part 776. The first fixed contact 7734, the second fixed contact 7736, and the contact signal input end 7738 are provided on the annular part 772. The switch signal input end 7731 is provided on the platform part 775.

The boss 713 is arranged opposite to or in contact with the switch signal input end 7731. The first support 17 is configured to hold the push member 71 pushed up by the coil spring 74 at an upper limit position.

When the first operating member 31 and/or the second operating member 33 is pushed/moved, the first operating member 31 drives the orthogonally arranged second sliding member 53 and third sliding member 55 to stably slide in a X direction and a Y direction, the X direction is perpendicular to the Y direction. At the same time, the first movable contact 73 and the second movable contact 75 which are connected to the second sliding member 53 and the third sliding member 55 respectively also stably slide in the X direction and the Y direction together. Since the first movable contact 73 and the second movable contact 75 are connected to the first fixed contact 7334 and the second fixed contact 7336, respectively, the output signals of the sliding positions of the second sliding member 53 and the third sliding member 55 can be input by the first fixed contact 7334 and the second fixed contact 7336, and a control signal can be output from the X direction signal output end 7735 and the Y direction signal output end 7737, thereby achieving precise control of displacement accuracy. Since a plurality of elastic pieces 52 are arranged crosswise on the outer periphery of the first sliding member 51, the first operating member 31 and the second operating member 33 can slide in a horizontal 360-degree omnidirectional range, and a force can be provided for the first operating member 31 and the second operating member 33 returning to the origin position.

When the first operating member 31 and/or the second operating member 33 are pressed, the first operating member 31 and/or the second operating member 33 is configured to move downward, pass through the second opening 531, the third opening 551, and the fourth opening 195, and drive the push member 71 to move downwards together. The boss 713 and/or the boss 713 of the push member 71 can contact the dome switch 79, thereby generating a switch signal, and the switch signal is output through the switch signal output end 7732. The first operating member 31 is pressed down in the horizontal 360-degree omnidirectional range of the first sliding member 51 to trigger the dome switch 79, thereby generating a switch signal, which is then output through the switch signal output end 7732.

The present disclosure further provides a handle. The handle includes the multi-directional input device 100. Since the handle adopts all the technical solutions of all the above-mentioned embodiments, it at least has all the beneficial effects brought by the technical solutions of the above-mentioned embodiments, which will not be repeated here one by one.

The present disclosure further provides a game machine. The game machine includes the handle. Since the game machine adopts all the technical solutions of all the above-mentioned embodiments, it at least has all the beneficial effects brought by the technical solutions of the above-mentioned embodiments, which will not be repeated here one by one.

The above are only the preferred embodiments of the present disclosure and do not limit the patent scope of the present disclosure. Any equivalent structural transformations made by the description and drawings of the present disclosure under the inventive concept of the present disclosure, or directly or indirectly used in other related technical fields are included in the patent protection scope of the present disclosure.

What is claimed is:

1. A multi-directional input device, applied to a game machine, wherein the multi-directional input device comprises:
    an upper case, defining an opening part in a center of a top part;
    a first operating member, protruding from the opening part;
    a first sliding member, having a disc-shaped structure, and configured to slide in a horizontal 360-degree omnidirectional range under driving of the first operating member;
    an elastic piece, arranged on an outer periphery of the first sliding member and configured to push the first sliding member back to an origin position;
    a second sliding member, configured to slide under driving of the first sliding member in a X direction;
    a third sliding member, configured to slide under driving of the first sliding member in a Y direction;
    a first movable contact, provided on the second sliding member;
    a second movable contact, provided on the third sliding member;
    a circuit board, comprising:
        a first fixed contact, in electrical contact with the first movable contact; and
        a second fixed contact, in electrical contact with the second movable contact; and
    a lower case, fitted and connected with the upper case, and accommodating the first operating member, the first sliding member, the elastic piece, the second sliding member, the third sliding member, the first movable contact, the second movable contact, and the circuit board;
    wherein:
    the first sliding member defines a first opening at a horizontal center to keep the first operating member movable vertically;
    the first operating member comprises a disc-shaped flange extending horizontally at an end at a lower side of the first sliding member;
    the multi-directional input device further comprises:
        a push member, comprising:
            a flat part, in contact with the disc-shaped flange and having a larger diameter than a diameter of the disc-shaped flange; and
            a boss, provided at a lower part of a horizontal center of the push member and configured to operate a switch function of a dome switch;
        a coil spring, configured to push the push member upward; and
        a first support, configured to hold the push member pushed up by the coil spring at an upper limit position, wherein the first sliding member is configured to slide in the horizontal 360-degree omnidirectional range under driving of the first operating member, and the first operating member is pressed within the horizontal 360-degree omnidirectional range to trigger the dome switch.

2. The multi-directional input device of claim 1, wherein the second sliding member is disposed orthogonally to the third sliding member, the second sliding member defines a second opening, the third sliding member defines a third opening, and the first sliding member is configured to pass through the second opening and the third opening to drive the second sliding member to slide in the X direction and the third sliding member to slide in the Y direction.

3. The multi-directional input device of claim 1, wherein at least one of the second sliding member and the third sliding member is combined with a metal frame defining an opening by injection molding.

4. The multi-directional input device of claim 1, wherein the flat part of the push member is circular or polygonal, an area of the flat part is greater than an area of the disc-shaped flange of the first operating member, and greater than or equal to a sliding amount of the first operating member.

5. The multi-directional input device of claim 1, wherein the flat part of the push member is circular or polygonal, an area of the flat part is less than or equal to an area of the disc-shaped flange of the first operating member, and less than or equal to a sliding amount of the first operating member.

6. The multi-directional input device of claim 1, wherein the circuit board is covered with the dome switch at a position opposite to the boss of the push member.

7. The multi-directional input device of claim 1, wherein the push member further comprises a protrusion part surrounding the boss and concentrically disposed with the boss.

8. A handle, comprising the multi-directional input device of claim 1.

9. A game machine, comprising the handle of claim 8.

* * * * *